M. T. VOIGT.
TRANSMISSION APPARATUS.
APPLICATION FILED JAN. 30, 1920.
1,431,198. Patented Oct. 10, 1922.
2 SHEETS—SHEET 1.
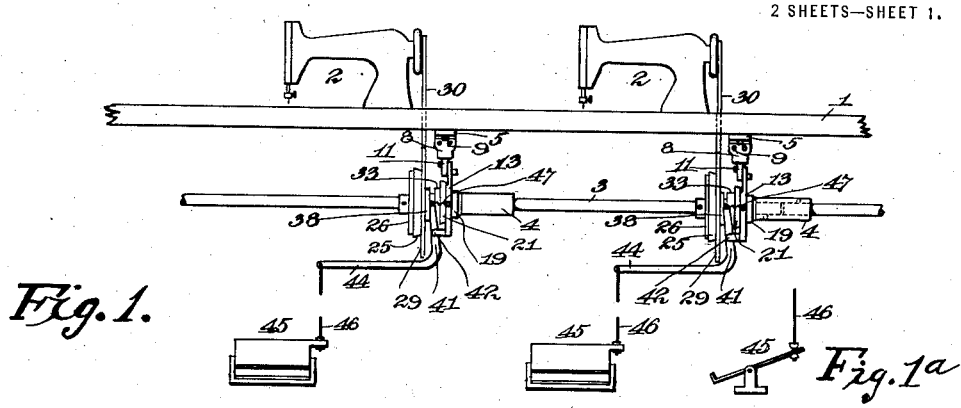
Fig. 1.
Fig. 1a.
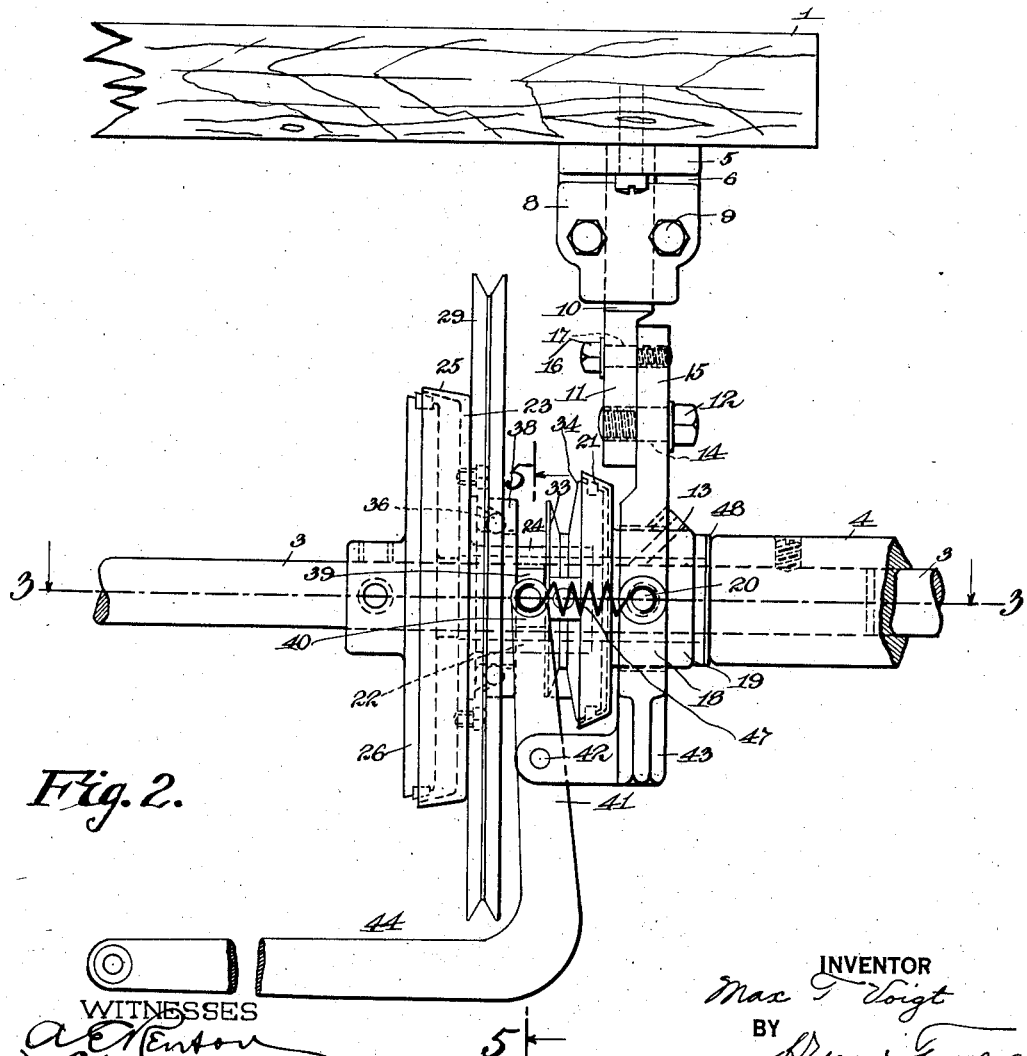
Fig. 2.
WITNESSES
INVENTOR
Max T. Voigt
BY
Dyer & Taylor
ATTORNEYS M. T. VOIGT.
TRANSMISSION APPARATUS.
APPLICATION FILED JAN. 30, 1920.
1,431,198.
Patented Oct. 10, 1922.
2 SHEETS—SHEET 2.
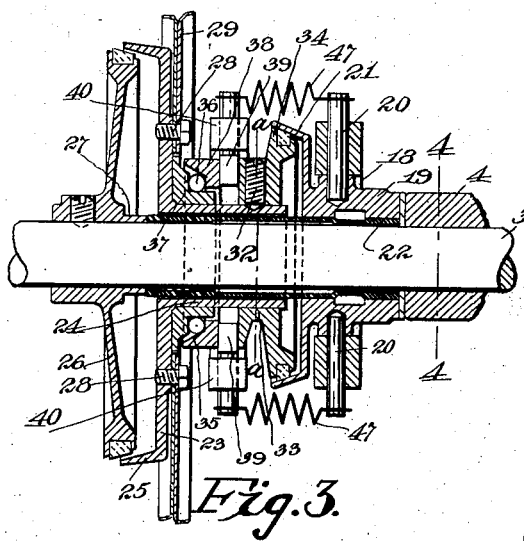
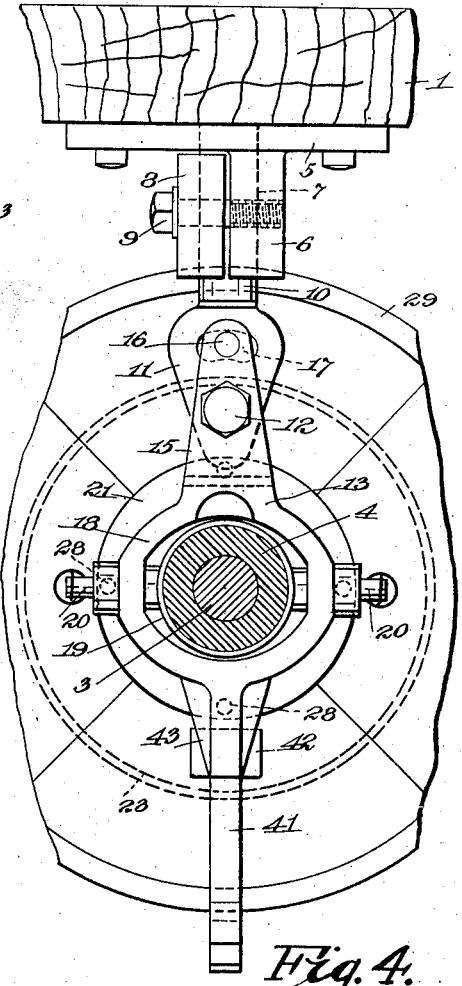
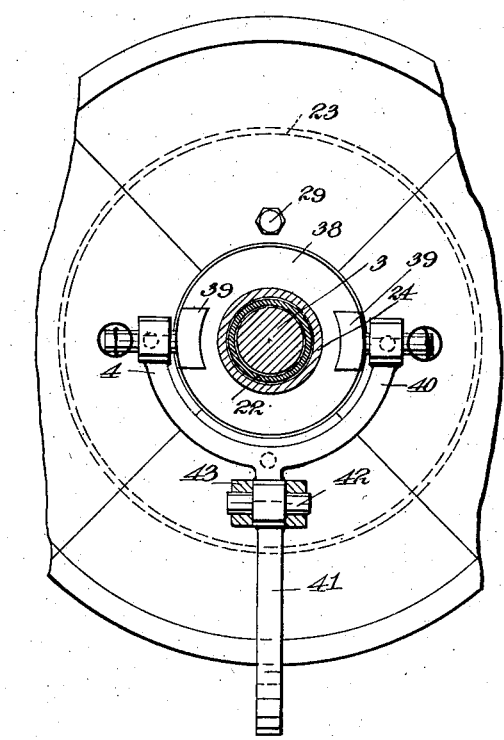
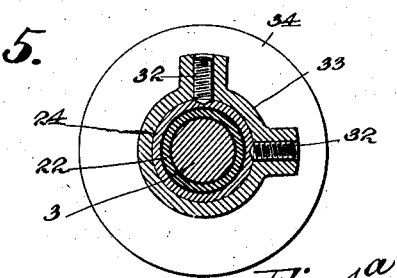
WITNESSES
INVENTOR
Max T. Voigt
BY
ATTORNEYS Patented Oct. 10, 1922.

1,431,198

UNITED STATES PATENT OFFICE.

MAX T. VOIGT, OF READING, PENNSYLVANIA, ASSIGNOR TO LOUIS FRANKEL, OF NEW YORK, N. Y.

TRANSMISSION APPARATUS.

Application filed January 30, 1920. Serial No. 355,141.

*To all whom it may concern:*

Be it known that I, MAX T. VOIGT, a citizen of Germany, and a resident of Reading, in the county of Berks and State of Pennslyvania, have invented a certain new and useful Transmission Apparatus, of which the following is a specification.

The invention relates to apparatus for transmitting motion from a continuously retating line shaft to any one of a plurality of mechanisms adapted to be operated therefrom, and to means whereby any one of said mechanisms may be individually connected to, or disconnected from the line shaft without effecting any other of the mechanisms, and more particularly to sewing machine benches or tables in which a number of machines are operated from a single line shaft located below the bench, and to which the sewing machines may be connected to operate the latter at the will of the individual operator.

The objects of the invention are to provide a device which is compact, having alining means for the line shaft, for reducing friction of the operating parts of the transmission devices, wherein the speed ratio between the line shaft and the sewing machine may be easily varied, to provide for free running of the line shaft and the transmission apparatus, to provide anti-friction means for taking the thrust of the shaft, and having means for universal adjustment of the line shaft and the devices carried thereby.

These and further objects will more fully appear in the following specification and accompanying drawings considered together or separately.

One embodiment of the invention is illustrated in the accompanying drawings, in which like parts in all of the several figures are designated by similar characters of reference, and in which—

Fig. 1 is a diagrammatic side elevation of a portion of a sewing machine work bench provided with my invention.

Fig. 1ª is a detail side elevation of a pedal.

Fig. 2 is a detail side elevation, on an enlarged scale, of a transmission apparatus.

Fig. 3 is a section on the line 3—3 of Fig. 2.

Fig. 4 is a transverse section taken on the line 4—4 of Fig. 3.

Fig. 4ª is a similar view taken on the line a—a of Fig 3, and

Fig. 5 is a similar view taken on the line 5—5 of Fig. 2.

In the drawings 1 designates the usual sewing machine work bench on which is carried a plurality of sewing machines 2. The sewing machines are spaced apart a distance sufficient for the operation of each machine by a different operator.

Mounted beneath the bench 1 and extending longitudinally thereof is a line shaft 3 to which power may be applied in any desired manner. The line shaft is preferably positioned in proximity to the under side of the bench whereby it will not contact with the person or the clothing of the operator when the latter is seated at the bench. The shaft 3 is preferably formed of short sections secured together in more or less axial alinement by means of couplings 4. The sections are preferably of such a length that the transmission mechanism for each machine 2 will be carried on a separate shaft section.

Secured to the under side of the bench 1 and adjacent each machine 2 is a bracket 5 carrying a bearing member 6. The member 6 is provided on one face with a semicircular groove 7, and a cap 8 adapted to be secured to the member 6 by means of bolts or screws 9 is provided with a similar groove which, when the cap is in position, will register with the groove in the member 6 to produce a cylindrical socket.

Carried within the socket formed in the member 6 and the cap 8 is a stem 10 which is frictionally held in position in the socket. The lower end of the stem carries a plate 11 to which is secured, by means of a bolt 12, a hanger 13. The bolt 12 passes through a cylindrical perforation 14 in an extension 15 of the hanger, and is threaded into a threaded opening in the plate 11. A stud bolt 16 carried in a threaded opening in the extension 15 passes through a segmental slot 17 in the plate as shown in Fig. 4. By loosening the bolts 12 and 16 the hanger 13 may be adjusted relatively to the plate 11 and stem 10, and by loosening the bolts 9 the stem and hanger, as an entirety may be adjusted relatively to the bracket 5.

The hanger 13 comprises a stirrup 18 within which is a hub 19 pivotally mounted on trunnions 20. At one end the hub carries a conical, annular flange 21 adapted to form the drum member of a brake. The hub 19 is provided with a central longitudinal bore in which is secured a tubular bushing 22. The bushing is preferably made of bronze and has a driving fit in the hub. The bushing extends beyond one end of the hub and forms an elongated bearing for the latter on the shaft 3.

A disc 23 having an elongated tubular hub 24 is mounted upon the extending portion of the bushing 22 and is freely movable relatively thereto. The disc 23 is provided with an annular, conical flange 25 which is adapted to form the external member or drum of a clutch, the internal member 26 of which is rigidly secured to the shaft 3 with its hub 27 in engagement with the end of the bushing 22. The member 26 carries on its periphery the usual leather or other elastic surface for engagement with the drum 25.

Rigidly but removably secured to the clutch member 23 by means of bolts 28 is a pulley 29 from which a sewing machine 2 may be driven by means of a belt 30. The pulley 29 is preferably of the split variety and the members thereof are secured together to form a circular structure by the bolts 28, by which the segments of the pulley are secured to the clutch member 23. The pulley may therefor be readily removed and another of a different diameter substituted.

Rigidly secured to the hub 24 of the clutch member 23 by means of bolts 32 is a hub 33 one end of which carries a conical brake member 34 adapted to be brought into cooperative relation with the brake member 21 carried by the hub 19.

A ball race 35 adapted to carry a series of balls 36 encircles the hub 24 of the clutch member 23. The balls 36 are interposed between the ball race 35 and an annular element 37 having a driving fit on the hub 24. The ball race 35 is formed in a ring 38 which is supported on the balls 36.

The ring 38 is held in position relatively to the element 35 by means of a pair of diametrically oppositely disposed flat shoes 39 which bear against the end of the ring and against the opposed end of the hub 33. The shoes are pivotally carried between the jaws 40—40 of a lever 41 pivoted at 42 on an extension 43 of the hanger 13. The lever 41 has an elongated arm 44 at an angle thereto and said arm is attached to a pedal 45 by means of a pitman 46. Each jaw 40 of the lever 41 is connected by means of a spring 47 with the hanger 13 as, for example, to the trunnions 20 which may extend through the hanger, as shown.

The bearing for each shaft section, when a sectional shaft be employed, is in the bushing 22 which is of considerable length, and the coupling 4 is preferably arranged in proximity to the end of the hub 19 with a washer 48 interposed between them. The transmission is, therefore, disposed between the clutch member 26 and the coupling 4 both of which are rigidly secured to the shaft. The brake member 34, the power pulley 29 and the clutch member 23 are rigidly secured together and may be rotated as a unit on the bushing 22 therefore the rotation of the shaft can have no effect on these members when the clutch member 23 is disengaged from the member 26. This feature is of importance for the reason that when the movable elements of the clutch and brake have their bearings on the rotating shaft there is always danger that these elements will freeze or stick to the shaft and throw the machines into operation, often with serious consequences.

The springs 47 will hold the brake members 21 and 34 in applied position and the clutch members 23 and 26 disengaged except when the pedal is operated to connect the sewing machine with the shaft to operate the former.

It is to be understood that in the preferred embodiment of the invention all of the elements below the bench 1 except the lever arm 44, the pitman 46 and the pedal are enclosed in suitable casings, as is known, to prevent accidents due to the clothing of the operator being caught in the moving parts.

The operation of the device is obvious from the above description.

In accordance with the provisions of the patent statutes the principle of the invention, has been described together with the apparatus which is now considered to represent the best embodiment thereof, but it is understood that the apparatus shown is merely illustrative, and that the invention may be carried out in other ways.

Having now described the invention what is claimed, and desired to be secured by Letters Patent, is:—

1. An apparatus of the character described, comprising a constantly rotating shaft, a bearing for the shaft, a pulley carried on the bearing and adapted to rotate relatively thereto, a clutch member carried by the shaft, a clutch member carried by the pulley, means for engaging the members, and means movable axially of the shaft for automatically disengaging the members.

2. An apparatus of the character described, comprising a constantly rotating shaft, a support for the shaft, a tubular element carried by the support, the bore of said element forming the bearing of the shaft, a pulley, the exterior of said element forming the bearing for the pulley, means for clutching the pulley to the shaft whereby said shaft and pulley will rotate in unison, a brake member movable axially of the shaft, said clutching means acting to release the brake, and means for automatically releasing the clutching means applying the brake.

3. An apparatus of the character described, comprising a constantly rotating shaft, a support for the shaft, a tubular element carried by the support, the bore of said element forming the bearing for the shaft, a pulley, the exterior of said element forming the bearing for the pulley, means for clutching the pulley to the shaft whereby said shaft and pulley will rotate in unison, and connections between the support and pulley movable axially of the shaft for releasing the clutching means.

4. An apparatus of the character described, comprising a constantly rotating shaft, a support for the shaft, a tubular element carried by and extending longitudinally from the support, the bore of said element forming the bearing of the shaft, a pulley, the exterior of said element forming the bearing for the pulley, an annular brake member carried by the support, an annular brake member carried by the pulley, means for clutching the pulley to the shaft whereby said shaft and pulley will rotate in unison, and connection between the support and pulley for releasing the clutching means and engaging the brake members.

5. An apparatus of the character described, comprising a constantly rotating shaft, a support for the shaft, a tubular element carried by and extending longitudinally from the support, the bore of said element forming the bearing of the shaft, a pulley, the exterior of said element forming the bearing for the pulley, an annular brake member carried by the support, an annular brake member carried by the pulley, means for clutching the pulley to the shaft whereby said shaft and pulley will rotate in unison, and connections between the support and pulley for simultaneously releasing the clutching means and engaging the brake members, there being an anti-friction device between the applying means and braking and clutching devices.

6. An apparatus of the character described, comprising a constantly rotating shaft, a support for the shaft, a brake member secured to the support, a tubular element secured to the support, surrounding the shaft and extending longitudinally thereof, said element forming the bearing for the shaft, a clutch member secured to the shaft, a body surrounding and carried by and rotatable relatively to the element, a clutch member carried by the body, a brake member carried by the body, means for moving the body to engage the clutch members and cause the body to rotate in unison with the shaft, and means for automatically moving the body to release the clutch member carried thereby and to engage the brake member to arrest the rotation of the body.

7. An apparatus of the character described, comprising a constantly rotating shaft, a support for the shaft, a brake member secured to the support, a tubular element secured to the support, surrounding the shaft and extending longitudinally thereof, said element forming the bearing for the shaft, a clutch member secured to the shaft, a body surrounding and carried by and rotatable relatively to the element, a clutch member carried by the body, a brake member carried by the body, means for moving the body to engage the clutch members and cause the body to rotate in unison with the shaft, and oppositely disposed means for automatically moving the body to release the clutch member carried thereby and to engage the brake member and arrest the rotation of the body.

8. An apparatus of the character described, comprising a constantly rotating shaft, a support for the shaft, a brake member secured to the support, a tubular element secured to the support, surrounding the shaft and extending longitudinally thereof, said element forming the bearing for the shaft, a clutch member secured to the shaft, a body surrounding and carried by and rotatable relatively to the element, a clutch member carried by the body, a brake member carried by the body, means for moving the body to engage the clutch members and cause the body to rotate in unison with the shaft, and oppositely disposed springs for automatically moving the body to release the clutch member carried thereby and to engage the brake member to arrest the rotation of the body.

MAX T. VOIGT.

Witnesses:
 DAVID FRANKEL,
 LOUIS FRANKEL.